US010948651B1

(12) United States Patent
Ho et al.

(10) Patent No.: US 10,948,651 B1
(45) Date of Patent: Mar. 16, 2021

(54) KEYBOARD BACKLIGHT MODULE AND MANUFACTURING METHOD THEREOF (71) Applicant: Chicony Power Technology Co., Ltd., New Taipei (TW)

(72) Inventors: Hsuan-Wei Ho, New Taipei (TW); Yi-Cheng Chang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/675,833

(22) Filed: Nov. 6, 2019

(30) Foreign Application Priority Data

Sep. 26, 2019 (TW) ................... 108134963

(51) Int. Cl.
*H01H 13/83* (2006.01)
*F21V 8/00* (2006.01)

(52) U.S. Cl.
CPC ......... *G02B 6/0061* (2013.01); *G02B 6/0021* (2013.01); *G02B 6/0065* (2013.01); *H01H 13/83* (2013.01); *H01H 2219/04* (2013.01); *H01H 2219/044* (2013.01); *H01H 2219/06* (2013.01); *H01H 2219/062* (2013.01)

(58) Field of Classification Search
CPC .............................. G06F 3/0202; H01H 13/83
See application file for complete search history.

(56) References Cited

U.S. PATENT DOCUMENTS

| | | | |
|---|---|---|---|
| 6,979,112 B2 | 12/2005 | Yu et al. | |
| 8,011,819 B2 | 9/2011 | Yue | |
| 8,057,056 B2 | 11/2011 | Zhu et al. | |
| 8,657,478 B2 | 2/2014 | Liu | |
| 2011/0168538 A1* | 7/2011 | Hwa | H01H 13/83 200/5 A |
| 2012/0013272 A1* | 1/2012 | Huang | G06F 3/0202 315/312 |
| 2014/0367238 A1* | 12/2014 | Chen | H01H 13/83 200/5 A |

(Continued)

FOREIGN PATENT DOCUMENTS

| | | |
|---|---|---|
| CN | 204084009 U | 1/2015 |
| CN | 204178989 U | 2/2015 |

(Continued)

*Primary Examiner* — Andrew J Coughlin
(74) *Attorney, Agent, or Firm* — Innovation Capital Law Group, LLP; Vic Lin (57) ABSTRACT

A keyboard backlight module includes a light-guiding sheet, a circuit board, a light-emitting element, a reflective sheet and a release film. The circuit board is located on a surface of the light-guiding sheet, and the reflective sheet is located on another surface of the light-guiding sheet opposite to the circuit board. The light-emitting element is located between the circuit board and the light-guiding sheet, and disposed on the circuit board. The light-emitting element emits light into the light-guiding sheet. The release film is located on the light-guiding sheet and the circuit board, and transfers a glue layer on the surface of the light-guiding sheet. The light-guiding sheet includes a plurality of illuminated patterns, and the keyboard backlight module adjusts the illumination uniformity of the light through the reflective sheet, the glue layer and the plurality of illuminated patterns.

15 Claims, 7 Drawing Sheets

(56) References Cited

U.S. PATENT DOCUMENTS

| | | | | |
|---|---|---|---|---|
| 2014/0369067 A1* | 12/2014 | Chen | .................... | G02B 6/0021 |
| | | | | 362/606 |
| 2015/0109757 A1* | 4/2015 | Chen | ..................... | H01H 13/83 |
| | | | | 362/23.03 |
| 2016/0357269 A1* | 12/2016 | Tai | ........................ | G06F 3/0202 |
| 2017/0004936 A1* | 1/2017 | Chen | ..................... | H01H 13/83 |
| 2017/0059770 A1* | 3/2017 | Jenkins | ................ | G02B 6/0065 |
| 2018/0149797 A1* | 5/2018 | Chen | ..................... | G06F 3/0202 |

FOREIGN PATENT DOCUMENTS

| | | | |
|---|---|---|---|
| CN | 204348576 U | 5/2015 | |
| CN | 206421125 U | 8/2017 | |
| CN | 206876921 U | 1/2018 | |
| TW | 201211637 A | 3/2012 | |
| TW | 201248222 A | 12/2012 | |
| TW | 201318017 A | 5/2013 | |
| TW | 201701317 A | 1/2017 | |
| TW | 201712379 A | 4/2017 | |
| TW | I636267 B | 9/2018 | |
| TW | I652710 B | 3/2019 | |
| TW | 201931410 A | 8/2019 | |

\* cited by examiner

KEYBOARD BACKLIGHT MODULE AND MANUFACTURING METHOD THEREOF

CROSS-REFERENCE TO RELATED APPLICATION

This non-provisional application claims priority under 35 U.S.C. § 119(a) to Patent Application No. 108134963 filed in Taiwan, R.O.C. on Sep. 26, 2019, the entire contents of which are hereby incorporated by reference.

BACKGROUND

Technical Field

The present invention relates to a keyboard backlight module and a manufacturing method thereof.

Related Art

With fast development of the electronic technology and the information industry, electronic devices such as computers, notebooks and smart phones have become indispensable tools in life and work of modern people. In addition, the electronic devices are mostly controlled through input devices such as mouse and/or keyboard. The usage of the keyboard is the most convenient.

For convenience of using the keyboards in a dark environment or providing a special usage requirement (for example, an appearance), technicians import a light source technology in the keyboards, so that an illuminated keyboard with a backlight module is developed. The backlight module is disposed at the bottom of a key module of the illuminated keyboard. The backlight module includes structures such as a light-shading sheet, a light-guiding sheet, a reflective sheet and a light-emitting element. To enable a light source to be evenly distributed, a generally used method is to dispose the light-emitting element at a side edge of the light-guiding sheet, and light is incident into the light-guiding sheet by the light-emitting element, so that the light incident into the light-guiding sheet is diffused in the light-guiding sheet through the light-guiding sheet and the reflective sheet, and the light diffused in the light-guiding sheet is merely emergent from the bottom of a key by using the light-shading sheet.

However, as thinness is required, how to further reduce an entire thickness of the backlight module is one of research objectives of the technicians. In addition, as distances between keys and the light source are different, the brightness of light emitted by the keys is also different, resulting in poor overall light-emitting uniformity of the keyboard, which affects a visual effect.

SUMMARY

In an embodiment, a keyboard backlight module includes a light-guiding sheet, a circuit board, a light-emitting element, a reflective sheet and a release film. The circuit board is located on a surface of the light-guiding sheet. The light-emitting element is located between the circuit board and the light-guiding sheet, and disposed on the circuit board. The light-emitting element emits light into the light-guiding sheet. The reflective sheet is located on another surface of the light-guiding sheet opposite to the circuit board. The release film is located on the surface of the light-guiding sheet and the circuit board, and transfers a glue layer on the surface of the light-guiding sheet. The light-guiding sheet includes a plurality of illuminated patterns, and the keyboard backlight module adjusts the illumination uniformity of the light through the reflective sheet, the glue layer and the plurality of illuminated patterns.

In an embodiment, a keyboard backlight module manufacturing method includes: sequentially stacking and attaching a reflective sheet, a light-guiding sheet and a circuit board; forming a glue layer on a first surface of a release film; and attaching the first surface of the release film to a first surface of the light-guiding sheet, to transfer the glue layer on the surface of the light-guiding sheet. A light-emitting element is disposed on the circuit board, the light-emitting element is located between the circuit board and the light-guiding sheet, and the circuit board is attached to the first surface of the light-guiding sheet.

In conclusion, the illumination uniformity of the light is adjusted through the reflective sheet, the glue layer and the illuminated patterns on the light-guiding sheet according to the keyboard backlight module and the manufacturing method thereof of the present invention. In some embodiments, the keyboard backlight module may achieve light uniformity without a light-shading sheet and may be further thinned (namely, relatively reduces an entire thickness of the keyboard backlight module), and costs may be relatively reduced.

BRIEF DESCRIPTION OF THE DRAWINGS

FIG. 2 is a combination diagram of the keyboard backlight module in

FIG. 1.

DETAILED DESCRIPTION

Figure 1:
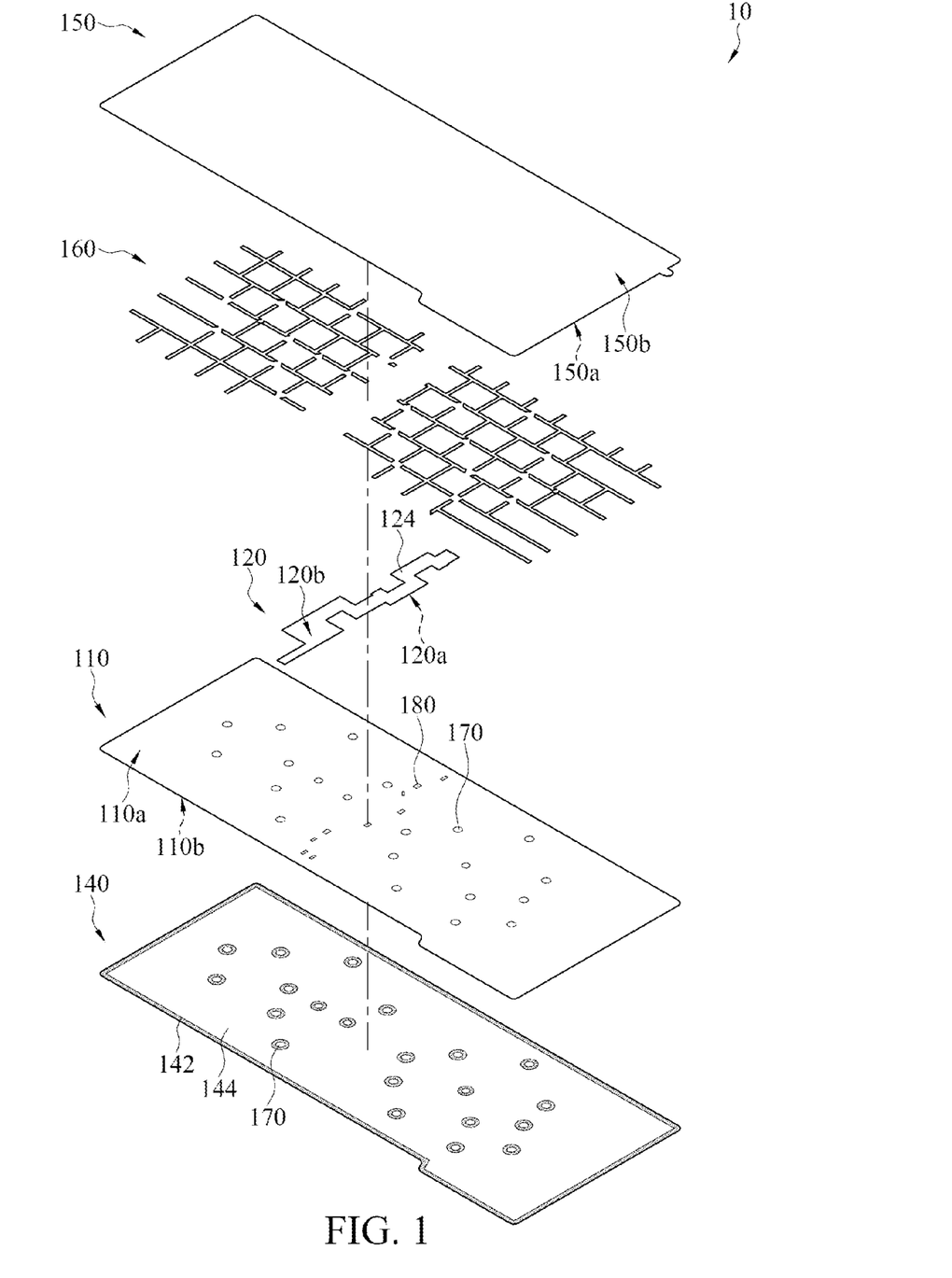
FIG. 1 is a schematic exploded diagram of a keyboard backlight module according to an embodiment.
Figure 2:
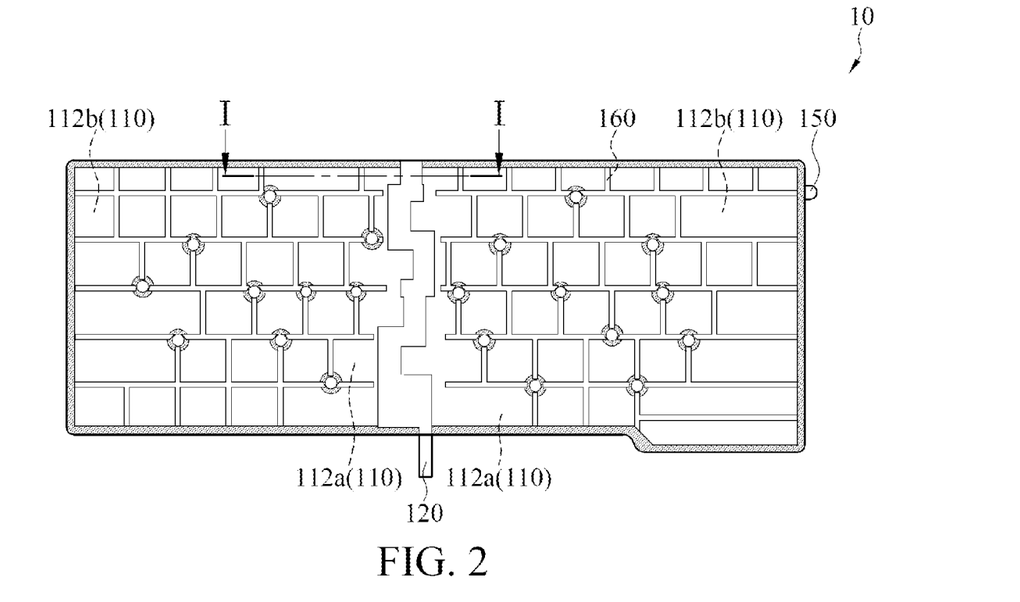

Referring to FIG. 1 and FIG. 2, a keyboard backlight module 10 includes a light-guiding sheet 110, a circuit board 120, a light-emitting element 130, a reflective sheet 140 and a release film 150.

The circuit board 120 is located on a surface of the light-guiding sheet 110. The reflective sheet 140 is located on another surface of the light-guiding sheet 110 opposite to the circuit board 120. In other words, the light-guiding sheet 110 includes a first surface 110*a* and a second surface 110*b* opposite to each other. The circuit board 120 is attached to the first surface 110a of the light-guiding sheet 110. The reflective sheet 140 is attached to the second surface 110b of the light-guiding sheet 110.

Figure 3:
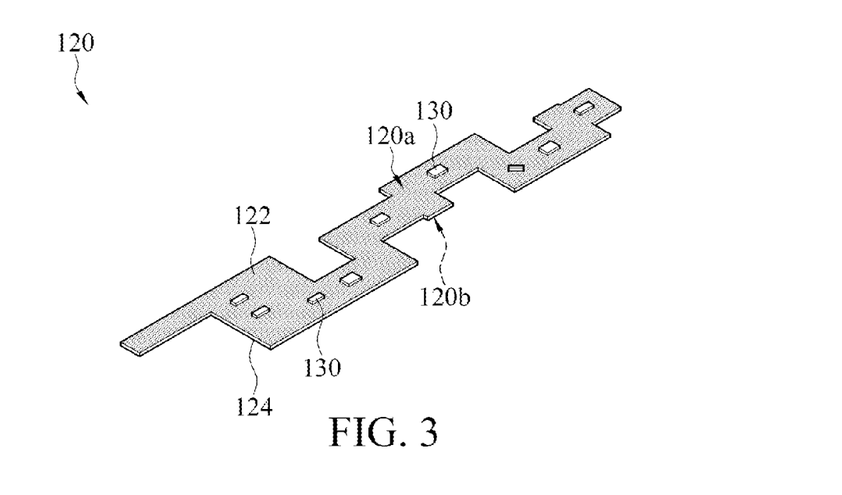
FIG. 3 is a schematic diagram of a circuit board in FIG. 1.

Referring to FIG. 1 to FIG. 3, the light-emitting element 130 is disposed on the circuit board 120. After the circuit board 120 is attached to the light-guiding sheet 110, the light-emitting element 130 is located between the circuit board 120 and the light-guiding sheet 110. In other words, the circuit board 120 includes two surfaces 120a and 120b opposite to each other. The light-emitting element 130 is located on the surface 120a of the circuit board 120, and is electrically coupled to a circuit (not shown) on the circuit board 120. The surface 120a of the circuit board 120 including the light-emitting element 130 faces the first surface 110a of the light-guiding sheet 110, and is attached to the first surface 110a of the light-guiding sheet 110. During usage of the keyboard backlight module 10, the circuit (not shown) on the circuit board 120 can drive the light-emitting element 130, so that the light-emitting element 130 emits light into the light-guiding sheet 110. In other words, the circuit board 120 can control an operation of the light-emitting element 130.

The release film 150 is located on the first surface 110a of the light-guiding sheet 110 and the circuit board 120. In this case, the release film 150 includes a first surface 150a and a second surface 150b opposite to each other. A glue layer 160 is correspondingly formed on the first surface 150a of the release film 150 in advance, then the release film 150 covers the first surface 110a of the light-guiding sheet 110 from a side of the light-guiding sheet 110 with the circuit board 120, to transfer the glue layer 160 on the first surface 110a of the light-guiding sheet 110 through the release film 150. In some embodiments, the glue layer 160 may be grid-like. It should be understood that, for clear drawing, in FIG. 1, though the glue layer 160 is located below the release film 150, because the release film 150 is transparent, the glue layer 160 is still drawn with solid lines. Similarly, for clear drawing, in FIG. 2, because the release film 150 and the light-guiding sheet 110 are transparent and the glue layer 160 is transparent or translucent, components located below, for example, the glue layer 160, the circuit board 120 and the reflective sheet 140 are still drawn with solid lines.

Figure 9:
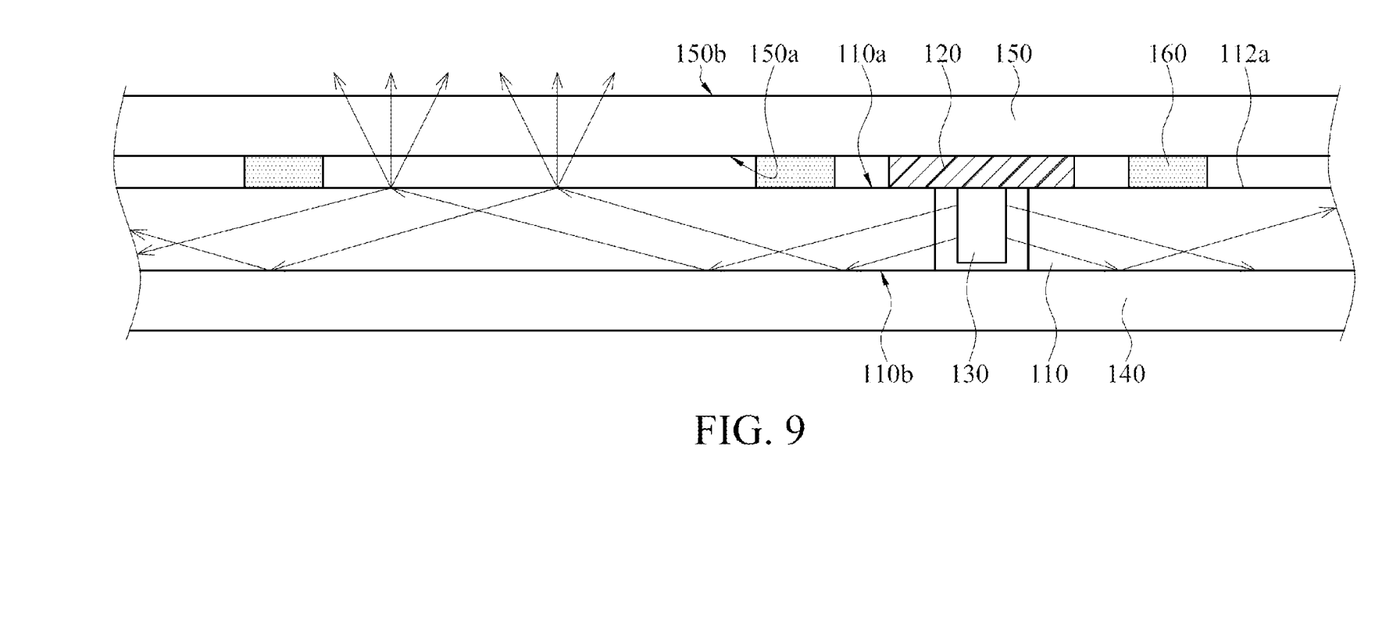
FIG. 9 is a schematic sectional diagram of the keyboard backlight module along a section line I-I in FIG. 1.

The light-guiding sheet 110 includes a plurality of illuminated patterns 114 (for example, patterns shown in FIG. 4 to FIG. 8). In this case, the keyboard backlight module 10 adjusts, through the reflective sheet 140, the glue layer 160 and the illuminated patterns 114, the illumination uniformity of the light emitted from the light-guiding sheet 110. In other words, referring to FIG. 9, the light emitted by the light-emitting element 130 is incident into the light-guiding sheet 110 from a side direction of the light-guiding sheet 110 and is laterally transmitted inside the light-guiding sheet 110; and during the transmission, the amount of the light emitted from the first surface 110a of the light-guiding sheet 110 is adjusted through the reflective sheet 140, the glue layer 160 and the illuminated patterns 114.

In some embodiments, there is a slot hole 180 at a location on the light-guiding sheet 110 corresponding to the light-emitting element 130. After the circuit board 120 is attached to the light-guiding sheet 110, the light-emitting element 130 disposed on the circuit board 120 is accommodated in the slot hole 180 of the light-guiding sheet 110. Therefore, the light emitted by the light-emitting element 130 is incident into the light-guiding sheet 110 from a side wall of the slot hole 180 of the light-guiding sheet 110, and is further laterally transmitted inside the light-guiding sheet 110.

In some embodiments, there is a plurality of illuminated areas 112a and 112b at locations on the first surface 110a of the light-guiding sheet 110 that correspond to keys. The illuminated areas 112a and 112b are disposed on the first surface 110a of the light-guiding sheet 110 corresponding to configurations and sizes of the keys of a keyboard module (not shown). In other words, after the keyboard backlight module 10 and the keyboard module are assembled, each of the illuminated areas 112a (or 112b) is an area in which the first surface 110a of the light-guiding sheet 110 overlaps a corresponding key, for example, an area covered by a vertical projection of the corresponding key on the first surface 110a of the light-guiding sheet 110. In some embodiments, the glue layer 160 is disposed along edges of the illuminated areas 112a and 112b. That is, the glue layer 160 includes a plurality of openings, and there is an illuminated area 112a (or 112b) in each of the openings. The illuminated patterns 114 are respectively disposed in the illuminated areas 112a and 112b in the openings. In some embodiments, the appearance and location of the circuit board 120 correspond to the plurality of illuminated areas 112a and 112b. In other words, a small part (not shown) of the plurality of illuminated areas of the light-guiding sheet 110 overlaps the circuit board 120, and the remaining part (for example, the illuminated areas 112a and 112b) separately corresponds to the openings of the glue layer 160. In an embodiment, the circuit board 120 may overlap a plurality of illuminated areas in the middle of the light-guiding sheet 110. The glue layer 160 is transferred on the first surface 110a of the light-guiding sheet 110 on two sides of the circuit board 120, and is stuck to the first surface 110a of the light-guiding sheet 110 along the edges of the illuminated areas 112a (or 112b) on the two sides of the circuit board 120.

Figure 4:
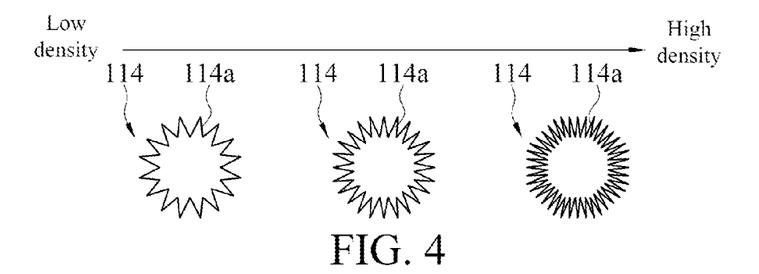
FIG. 4 is a schematic diagram of a first example of an illuminated pattern.
Figure 5:
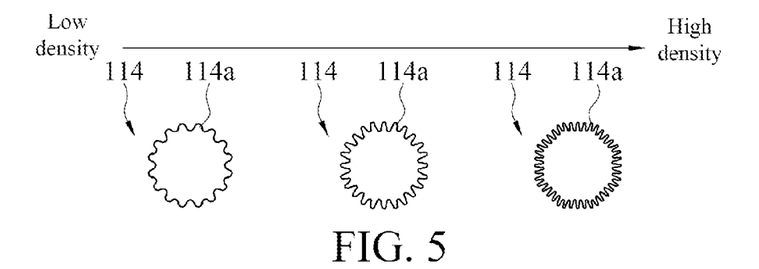
FIG. 5 is a schematic diagram of a second example of an illuminated pattern.
Figure 6:
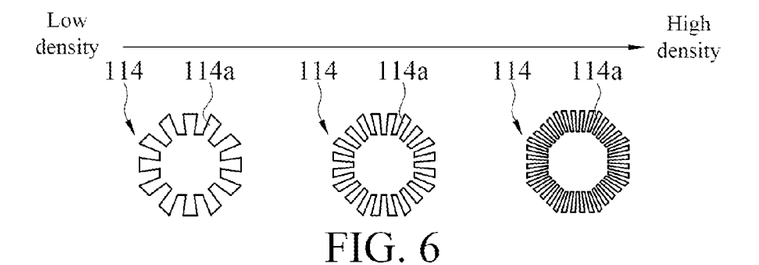
FIG. 6 is a schematic diagram of a third example of an illuminated pattern.
Figure 7:
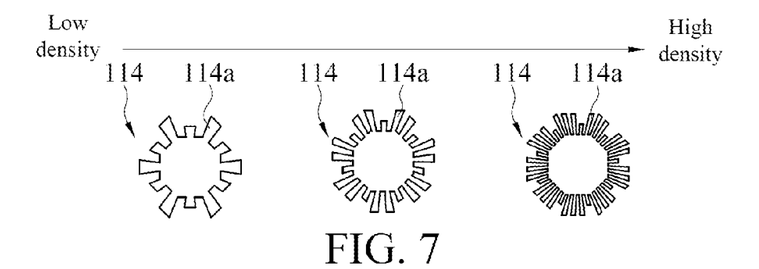
FIG. 7 is a schematic diagram of a fourth example of an illuminated pattern.
Figure 8:
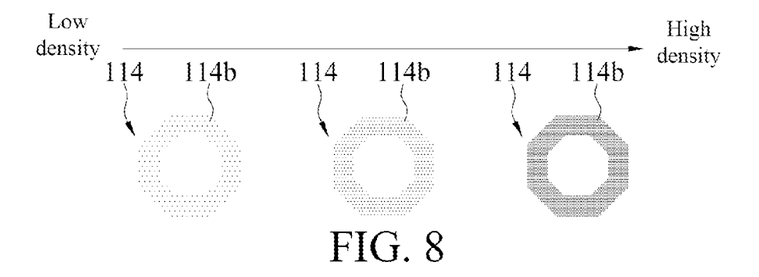
FIG. 8 is a schematic diagram of a fifth example of an illuminated pattern.

In some embodiments, each of the illuminated patterns 114 (that is, an entire appearance) may be a polygon, an entire appearance of the illuminated pattern 114 is a polygon, and each edge line of the illuminated patterns 114 is a saw-tooth wave (as shown in FIG. 4), a sine wave (as shown in FIG. 5), a square wave (as shown in FIG. 6 or FIG. 7) or any combination thereof. In other words, each of the illuminated patterns 114 is a polygon pattern formed by lines of continuous unit patterns 114a. In this case, the illumination brightness of the corresponding illuminated area 112a (or 112b) is adjusted by adjusting the density of the unit patterns 114a of each edge line of the illuminated patterns 114. For example, at a distal end (that is, the illuminated area 112b far away from the light-emitting element 130) on the light-guiding sheet 110 relative to a light source, the density of light energy is relatively low, and therefore the density of saw tooth of each edge line of the illuminated patterns 114 here is relatively high. Correspondingly, at a proximal end (that is, the illuminated area 112a close to the light-emitting element 130) on the light-guiding sheet 110 relative to the light source, the density of light energy is relatively high, and therefore the density of saw tooth of each edge line of the illuminated patterns 114 here is relatively low. The density of the unit patterns 114a of each edge line may be adjusted by, for example, adjusting the width of each of the unit patterns 114a, the amplitude of each of the unit patterns 114a, and/or the total quantity of the unit patterns 114a. For example, taking the saw-tooth wave as an example, the density of the unit patterns 114a of each edge line may be adjusted by, for example, adjusting the pitch (that is, the width) of each of the saw tooth, the amplitude of each of the saw tooth, and/or the total quantity of the saw tooth. In other words, the density of the illuminated patterns 114 far away from the light-emitting element 130 is greater than the density of the illuminated patterns 114 close to the light-emitting element 130. In some embodiments, the unit patterns 114a may be formed by a plurality of microstructures (for example, net points) concatenated with each other. In some embodiments, each of the illuminated patterns 114 (that is, the entire appearance) may be, for example, an octagon, but is not limited thereto.

In some embodiments, each of the illuminated patterns 114 may be a polygon pattern formed by a plurality of discrete net points 114b. In this case, the illumination brightness of the corresponding illuminated area 112a (or 112b) is adjusted by adjusting the density of the net points 114b of each of the illuminated patterns 114 (that is, the spacing between two neighboring net points 114b and the total quantity of the net points 114b). For example, at a distal end (that is, the illuminated area 112b far away from the light-emitting element 130) on the light-guiding sheet 110 relative to the light source, the density of light energy is relatively low, and therefore the density of the net points 114b of the illuminated patterns 114 here is relatively high. Correspondingly, at a proximal end (that is, the illuminated area 112a close to the light-emitting element 130) on the light-guiding sheet 110 relative to the light source, the density of light energy is relatively high, and therefore the density of the net points 114b of the illuminated patterns 114 here is relatively low. In other words, the density of the illuminated patterns 114 far away from the light-emitting element 130 is greater than the density of the illuminated patterns 114 close to the light-emitting element 130.

In some embodiments, the circuit board 120 includes a light-cutoff part 122, and the light-cutoff part 122 is located around the light-emitting element 130. In some embodiments, the light-cutoff part 122 may be a black ink layer. In an embodiment, the black ink layer (that is, the light-cutoff part 122) may cover an entire surface of a body 124 of the circuit board 120, that is, the surface 120a including the light-emitting element 130. In another embodiment, the black ink layer (that is, the light-cutoff part 122) may partially cover the surface of the body 124 of the circuit board 120 corresponding to the light-emitting element 130, that is, be merely used to coat the partial surface 120a (not shown) around the light-emitting element 130.

In some embodiments, the reflective sheet 140 includes a light-cutoff part 142, and the light-cutoff part 142 is disposed corresponding to a bright region of the light-guiding sheet 110. In some embodiments, the light-cutoff part 142 is located on a surface of a body 144 of the reflective sheet 140 and is disposed around the body 144 of the reflective sheet 140. In some embodiments, the light-cutoff part 142 may be a black ink layer. In an embodiment, the black ink layer (that is, the light-cutoff part 142) may cover the surface of the body 144 of the reflective sheet 140 along an edge of the body 144 of the reflective sheet 140. For example, the black ink layer is in a frame shape with a central opening, and the frame-shaped black ink layer is disposed along a peripheral edge of the reflective sheet 140. In some embodiments, the keyboard backlight module 10 may further include a plurality of through holes 170, and each of the through holes 170 penetrates through the light-guiding sheet 110 and the reflective sheet 140. In this case, the black ink layer (that is, the light-cutoff part 142) may cover the surface of the body 144 of the reflective sheet 140 along the peripheral edge of the body 144 of the reflective sheet 140 and a peripheral edge of each of the through holes 170.

Figure 10:
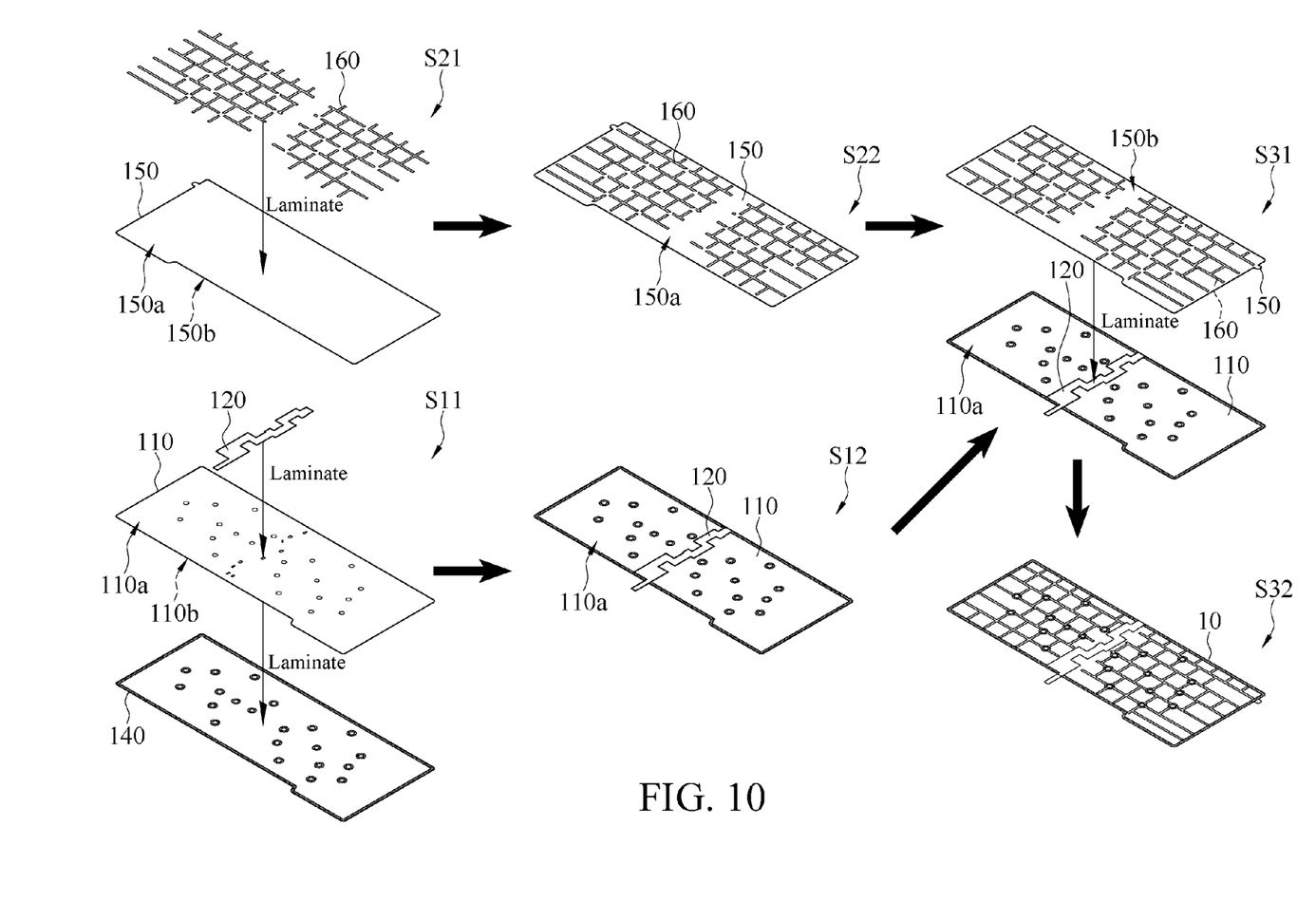
FIG. 10 is a flowchart of a keyboard backlight module manufacturing method according to an embodiment.

In some embodiments, the foregoing keyboard backlight module 10 may be manufactured by the following steps. Referring to FIG. 10, first, the reflective sheet 140, the light-guiding sheet 110 and the circuit board 120 are sequentially stacked and attached from bottom to top (step S11), to form a semi-finished product in which the reflective sheet 140 and the circuit board 120 are respectively attached to two opposite surfaces of the light-guiding sheet 110 (step S12). In other words, the first surface 110a of the light-guiding sheet 110 is attached to the circuit board 120, and the second surface 110b of the light-guiding sheet 110 is attached to the reflective sheet 140. Before the light-guiding sheet 110 and the circuit board 120 are attached to each other, the light-emitting element 130 is first disposed on the circuit board 120 and is electrically coupled to the circuit on the circuit board 120. Then, the surface 120a of the circuit board 120, where the light-emitting element 130 are disposed, faces the first surface 110a of the light-guiding sheet 110, and is attached to the first surface 110a of the light-guiding sheet 110. After attaching, the light-emitting element 130 is located between the circuit board 120 and the light-guiding sheet 110.

In addition, the release film 150 with the glue layer 160 is provided. In some embodiments, the glue layer 160 is formed on a first surface 150a of the release film 150 according to the configurations and sizes (that is, corresponding to the edges of the illuminated areas 112a and 112b of the light-guiding sheet 110) of keys of the keyboard module (step S21), to form the release film 150 with the glue layer 160 (step S22).

Then, the first surface 150a of the release film 150 is adhered to the first surface 110a of the light-guiding sheet 110 (step S31), to form the keyboard backlight module 10 (step S32). In this case, the release film 150 is adhered to the light-guiding sheet 110 by using the glue layer 160. The adhesion of the glue layer 160 to the release film 150 is less than the adhesion to the light-guiding sheet 110. Therefore, after the release film 150 is adhered to the light-guiding sheet 110, the glue layer 160 may be transferred to the first surface 110a of the light-guiding sheet 110 from the release film 150. In some embodiments, the glue layer 160 may be, for example, glue of model 3M7533.

Figure 11:
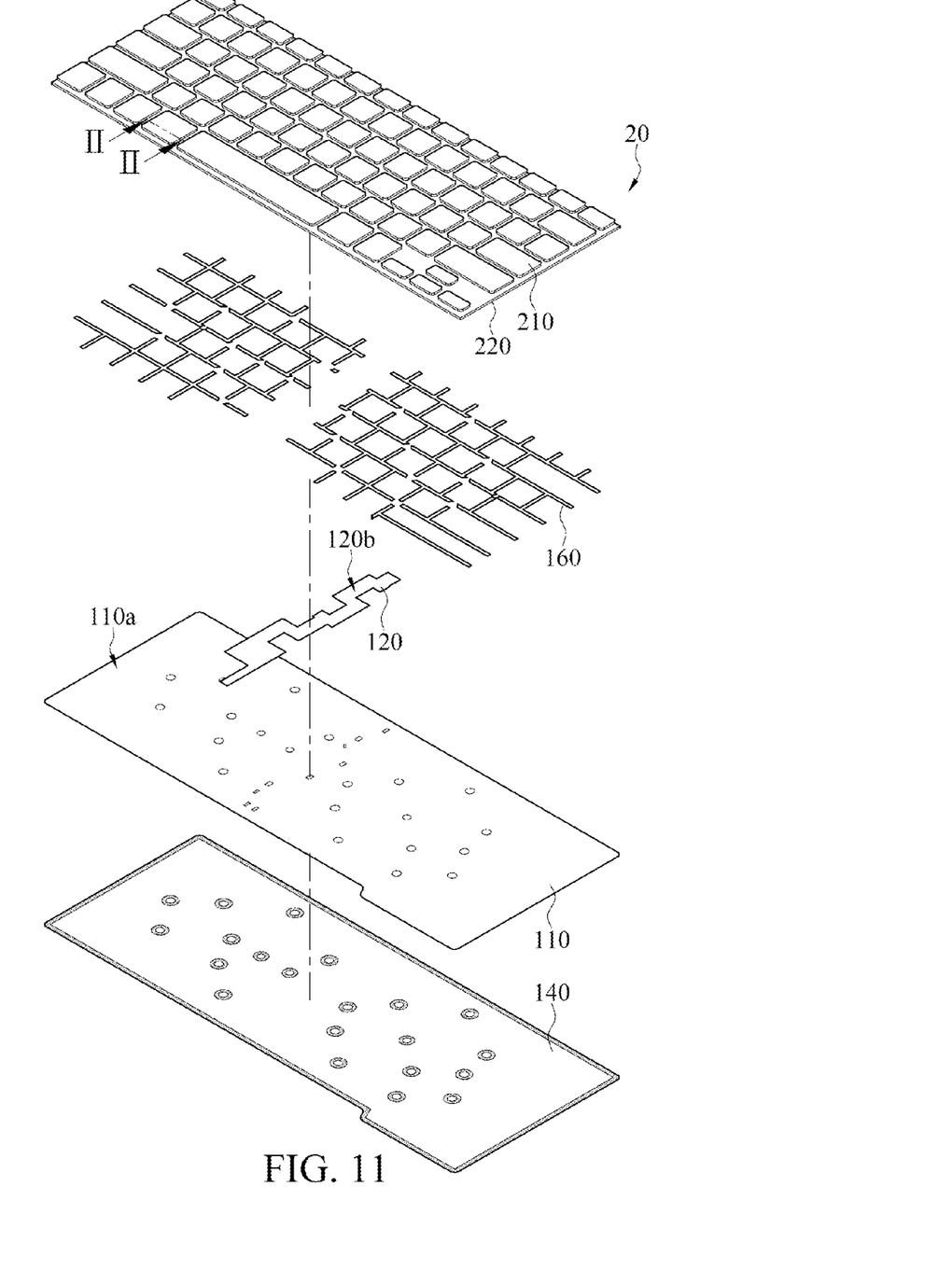
FIG. 11 is a schematic exploded diagram of an illuminated keyboard according to an embodiment.
Figure 12:
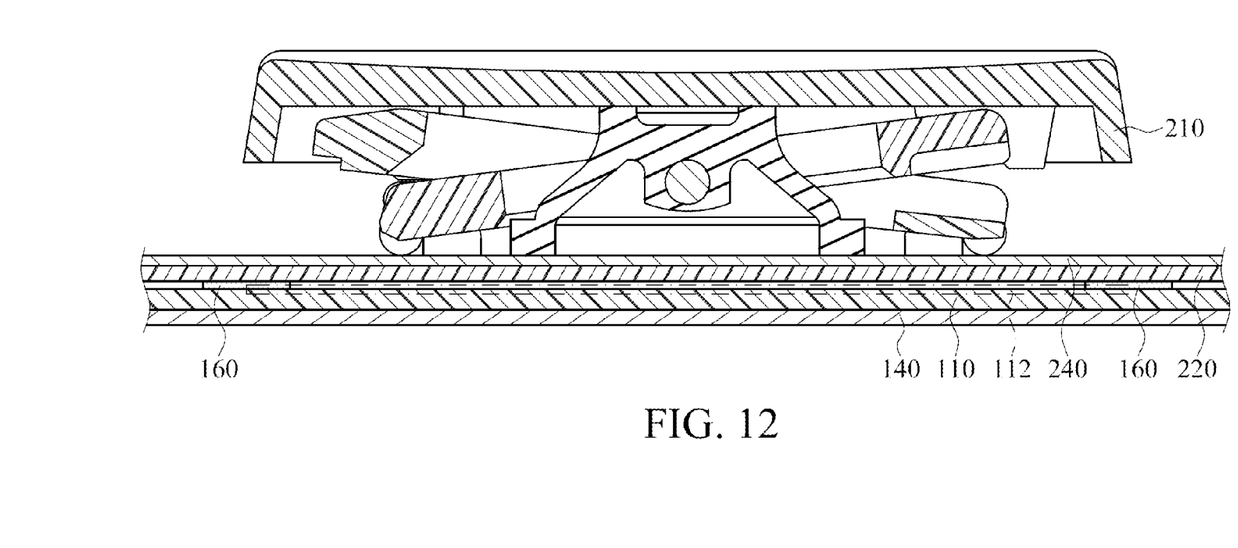
FIG. 12 is a schematic sectional diagram of the illuminated keyboard along a section line II-II in FIG. 11.

In some embodiments, when an illuminated keyboard is assembled, the release film 150 may be first removed from the keyboard backlight module 10; and after the release film 150 is removed, the glue layer 160 is not removed accordingly, but is still stuck to the light-guiding sheet 110. Then, after the release film 150 is removed, the keyboard backlight module 10 is adhered to a base sheet 220 of the keyboard module 20 through the glue layer 160 transferred on the light-guiding sheet 110, to form the illuminated keyboard, as shown in FIG. 11. In some embodiments, referring to FIG. 11 and FIG. 12, the keyboard module 20 includes a plurality of keys 210. In some embodiments, when the keyboard backlight module 10 is adhered to the keyboard module 20, the keys 210 of the keyboard module 20 are separately aligned with the illuminated areas 112 of the light-guiding sheet 110. After the adhesion, vertical projections of the keys 210 of the keyboard module 20 overlap the illuminated areas 112 of the light-guiding sheet 110, as shown in FIG. 11. In some embodiments, the keyboard module 20 may further include a circuit board 240, and the circuit board 240 is located between the keys 210 and the base sheet 220. In this case, the circuit board 240 of the keyboard module 20 can sense touches on the keys 210, and correspondingly generate touching signals of characters represented by the touched keys 210.

In some embodiments, the keyboard backlight module 10 includes the through holes 170 penetrating through the light-guiding sheet 110 and the reflective sheet 140. When the illuminated keyboard is assembled, after the keyboard backlight module 10 is adhered to the keyboard module 20, the keyboard backlight module 10 may be adhered to the keyboard module 20 steadily by filling the through holes 170 with fixing glue (for example, hot melt glue).

In some embodiments, before the step S11, the illuminated patterns 114 is formed on the first surface 110a of the light-guiding sheet 110 through heat-pressing based on designed patterns. For example, by using a heat-pressing process or a heat-rolling process, structure graphics on a male die are transferred onto the first surface 110a of the light-guiding sheet 110 through surface pressure contact to form each of the illuminated patterns 114 on the light-guiding sheet 110. In some embodiments, the designed patterns may be a polygon, for example, an octagon, but is not limited thereto. Each of edge lines of the polygonal designed patterns may be formed by the continuous unit patterns 114a or the discrete net points 114b. In some embodiments, the designed patterns may be designed according to the characters represented by the keys 210 of the keyboard module 20.

In some embodiments, before the step S11, the surface of the circuit board 120 around the light-emitting element 130 may be coated with black ink. In an example, the black ink may be merely used to coat a partial surface of the circuit board 120 around the light-emitting element 130. In another example, the black ink may be used to coat the entire surface of the circuit board 120 where the light-emitting element 130 is disposed.

In some embodiments, before the step S11, a surface of the reflective sheet 140 that is attached to the light-guiding sheet 110 may be coated with the black ink corresponding to a bright region of the light-guiding sheet 110. In an example, the black ink layer may be used to coat the edges of the reflective sheet 140 along an entire periphery of the reflective sheet 140. In another example, the black ink layer may be used to coat the edges of the reflective sheet 140 along the entire periphery of the reflective sheet 140, and/or coat the reflective sheet 140 on the edges of the through holes 170 along an entire periphery of the through holes 170.

In conclusion, the illumination uniformity of the light is adjusted through the reflective sheet 140, the glue layer 160 and the illuminated patterns 114 on the light-guiding sheet 110 according to the keyboard backlight module and the manufacturing method thereof of the disclosure. In some embodiments, the keyboard backlight module 10 may achieve light uniformity without a light-shading sheet and may be further thinned (namely, relatively reduces an entire thickness of the keyboard backlight module 10), and costs may be relatively reduced. In some embodiments, there is a light-cutoff part (122 and/or 142) properly disposed in the keyboard backlight module 10, to adjust the illumination brightness, thereby reducing the illumination brightness at an illuminated location of the corresponding light-cutoff part (122 and/or 142). In some embodiments, in the keyboard backlight module 10, the illuminated patterns 114 on the light-guiding sheet 110 are correspondingly designed according to the light energy transmitted to each part of the light-guiding sheet 110, to further adjust the illumination uniformity, thereby providing a surface light source with more uniform entire brightness.

What is claimed is:
1. A keyboard backlight module, comprising:
 a light-guiding sheet;
 a circuit board, located on a surface of the light-guiding sheet;
 a light-emitting element, located between the circuit board and the light-guiding sheet, disposed on the circuit board, and configured to emit light into the light-guiding sheet;
 a reflective sheet, located on another surface of the light-guiding sheet opposite to the circuit board;
 a glue layer, located directly on the surface of the light-guiding sheet; and
 a release film, removably located on the glue layer;
 wherein when the release film is removed from the glue layer, the glue layer is fully transferred from the release film to the surface of the light-guiding sheet; and
 wherein the light-guiding sheet comprises a plurality of illuminated patterns, and the keyboard backlight module adjusts illumination uniformity of the light through the reflective sheet, the glue layer and the plurality of illuminated patterns.

2. The keyboard backlight module according to claim 1, wherein the circuit board comprises a light-cutoff part, located around the light-emitting element.

3. The keyboard backlight module according to claim 2, wherein the light-cutoff part is a black ink layer.

4. The keyboard backlight module according to claim 1, wherein the reflective sheet comprises a light-cutoff part, disposed corresponding to a bright region of the light-guiding sheet.

5. The keyboard backlight module according to claim 4, wherein the light-cutoff part is a black ink layer.

6. The keyboard backlight module according to claim 1, wherein in the plurality of illuminated patterns, density of illuminated patterns far away from the light-emitting element is greater than density of illuminated patterns close to the light-emitting element.

7. The keyboard backlight module according to claim 6, wherein each of the plurality of illuminated patterns is a polygon.

8. A keyboard backlight module manufacturing method, comprising:
 sequentially stacking and attaching a reflective sheet, a light-guiding sheet and a circuit board, wherein the circuit board is attached to the first surface of the light-guiding sheet, a light-emitting element is disposed on the circuit board, and the light-emitting element is located between the circuit board and the light-guiding sheet;
 forming a glue layer on a first surface of a release film; and
 attaching the first surface of the release film to a first surface of the light-guiding sheet by using the glue layer, wherein after the attaching step, the glue layer is directly located on the first surface of the light-guiding sheet, and the circuit board is located between and the release film, and wherein when the release film is removed from the glue layer, the glue layer is fully transferred from the release film to the light-guiding sheet.

9. The keyboard backlight module manufacturing method according to claim 8, further comprising:
 forming a plurality of illuminated patterns on the first surface of the light-guiding sheet through heat-pressing before the step of sequentially stacking and attaching the reflective sheet, the light-guiding sheet and the circuit board.

10. The keyboard backlight module manufacturing method according to claim 8, further comprising:
 coating a surface of the circuit board around the light-emitting element with black ink before the step of sequentially stacking and attaching the reflective sheet, the light-guiding sheet and the circuit board.

11. The keyboard backlight module manufacturing method according to claim 8, further comprising:
coating a surface of the reflective sheet attached to the light-guiding sheet with black ink corresponding to a bright region of the light-guiding sheet before the step of sequentially stacking and attaching the reflective sheet, the light-guiding sheet and the circuit board.

12. A keyboard backlight module, comprising:
a light-guiding sheet, comprising a plurality of illuminated areas;
a circuit board, located on a part of a first surface of the light-guiding sheet;
a light-emitting element, located between the circuit board and the light-guiding sheet, disposed on the circuit board, and configured to emit light into the light-guiding sheet;
a reflective sheet, located on another surface of the light-guiding sheet opposite to the circuit board; and
a glue layer, located directly on another part of the first surface of the light-guiding sheet, wherein the glue layer is disposed along an edge of at least one of the plurality of illuminated areas.

13. The keyboard backlight module according to claim 12, wherein the glue layer includes a plurality of openings, and any one of the plurality of illuminated areas is located in one of the plurality of openings.

14. The keyboard backlight module according to claim 13, wherein any one of the plurality of openings only accommodates one of the plurality of illuminated areas.

15. The keyboard backlight module according to claim 12, wherein the plurality of illuminated areas are separated by the glue layer.

* * * * *